United States Patent
Ramesh

(10) Patent No.: US 11,257,634 B2
(45) Date of Patent: Feb. 22, 2022

(54) DISCONNECTOR POLE FOR GAS INSULATED SWITCHGEAR

(71) Applicant: Nuventura GmbH, Berlin (DE)

(72) Inventor: Manjunath Ramesh, Berlin (DE)

(73) Assignee: NUVENTURA GMBH, Berlin (DE)

( * ) Notice: Subject to any disclaimer, the term of this patent is extended or adjusted under 35 U.S.C. 154(b) by 0 days.

(21) Appl. No.: 16/631,425

(22) PCT Filed: Jul. 31, 2018

(86) PCT No.: PCT/EP2018/070717
§ 371 (c)(1),
(2) Date: Jan. 15, 2020

(87) PCT Pub. No.: WO2019/025434
PCT Pub. Date: Feb. 7, 2019

(65) Prior Publication Data
US 2020/0219672 A1    Jul. 9, 2020

(30) Foreign Application Priority Data
Aug. 3, 2017 (EP) .................................... 17184768

(51) Int. Cl.
*H01H 1/42* (2006.01)
*H01H 31/28* (2006.01)
(Continued)

(52) U.S. Cl.
CPC ............. *H01H 1/42* (2013.01); *H01H 31/28* (2013.01); *H01H 33/6661* (2013.01);
(Continued)

(58) Field of Classification Search
CPC .................. H01H 1/42; H01H 33/666; H01H 2033/6667; H01H 1/365; H01H 31/28;
(Continued)

(56) References Cited

U.S. PATENT DOCUMENTS 6,984,795 B1 * 1/2006 Kowalik ................ H01H 31/28
200/48 CB
8,779,318 B2 * 7/2014 Espeseth ............ H01H 33/6661
218/124

(Continued)

FOREIGN PATENT DOCUMENTS

CN    204230137    3/2015
CN    105264627    1/2016
(Continued)

OTHER PUBLICATIONS

International Search Report issued in connection with PCT Application No. PCT/Ep2018/070717 dated Oct. 8, 2018.
(Continued)

Primary Examiner — Ahmed M Saeed
(74) Attorney, Agent, or Firm — Hodgson Russ LLP

(57) ABSTRACT

The invention refers to a disconnector pole (214) for a gas insulated switchgear and a disconnector unit comprising at least two of the aforementioned disconnector poles (214). Moreover, the invention refers to a gas insulated switchgear comprising at least one aforementioned disconnector pole (214) or at least one aforementioned disconnector unit and/or a circuit breaker. The disconnector pole (214) is movable between two contact positions. Moreover, the disconnector pole (214) comprises a metallic contact device (218, 220A, 220B, 221A, 221B, 222A, 222B) to be connected to contacts in the two contact positions. The metallic contact device (218, 220A, 220B, 221A, 221B, 222A, 222B) comprises an outer surface (256). The disconnector pole (214) also comprises at least one metallic housing (219), wherein at least 50% of the entire outer surface (256) of the metallic contact device (218, 220A, 220B, 221A, 221B, 222A, 222B) is arranged in the metallic housing (219).

12 Claims, 13 Drawing Sheets

(51) Int. Cl.
*H01H 33/666* (2006.01)
*H02B 13/035* (2006.01)
*H01H 21/54* (2006.01)

(52) U.S. Cl.
CPC ......... *H02B 13/0352* (2013.01); *H01H 21/54* (2013.01); *H01H 2001/425* (2013.01); *H01H 2031/286* (2013.01); *H01H 2205/002* (2013.01)

(58) Field of Classification Search
CPC ............... H01H 33/6661; H01H 21/54; H01H 2001/425; H01H 2031/286; H01H 2205/002; H02B 13/0352
See application file for complete search history.

(56) References Cited

U.S. PATENT DOCUMENTS

| | | | |
|---|---|---|---|
| 9,466,955 B2 | 10/2016 | Saxegaard et al. | |
| 9,767,978 B1* | 9/2017 | Brandt | H01H 71/0235 |
| 2014/0104758 A1* | 4/2014 | Bjortuft | H01H 31/003 |
| | | | 361/605 |
| 2016/0049775 A1 | 2/2016 | Saxegaard et al. | |
| 2016/0141136 A1* | 5/2016 | Ashtekar | H01H 71/1009 |
| | | | 200/50.01 |
| 2018/0197709 A1* | 7/2018 | Liu | H01H 31/003 |

FOREIGN PATENT DOCUMENTS

| | | |
|---|---|---|
| CN | 106128845 | 11/2016 |
| CN | 206259644 | 6/2017 |
| DE | 3215110 A1 | 11/1982 |
| EP | 0708462 A1 | 4/1996 |

OTHER PUBLICATIONS

European Search Report issued in connection with European Application No. EP17184768 dated Jan. 5, 2018.
IPI, Office Action for IN Application No. 202017008724, dated Nov. 27, 2020.
IPA, Examination Report No. 1 for AU Application No. 2018310636, dated Oct. 19, 2020.
KIPO, Office Action for KR Application No. 10-2020-7006182, dated Jun. 28, 2021.
CNIPA, First Office Action for CN Application No. 201880047998.7, dated Jul. 21, 2021.
ISDEC, Office Action for CA Application No. 3070518, dated Aug. 4, 2021.

* cited by examiner

DISCONNECTOR POLE FOR GAS INSULATED SWITCHGEAR

CROSS-REFERENCE TO RELATED APPLICATIONS

This is a 35 U.S.C. 371 National Stage Patent Application of International Application No. PCT/EP2018/070717, filed Jul. 31, 2018, which claims priority to European application 17184768.4, filed Aug. 3, 2017, each of which is hereby incorporated by reference in its entirety.

TECHNICAL FIELD

The invention refers to a disconnector pole for a gas insulated switchgear and to a disconnector unit comprising at least two of the aforementioned disconnector poles. Moreover, the invention refers to a gas insulated switchgear comprising at least one aforementioned disconnector pole or at least one aforementioned disconnector unit and/or a circuit breaker having a vacuum interrupter.

BACKGROUND OF THE INVENTION

A switchgear serves as an interface in an electrical supply and an electrical load. A known switchgear for medium voltage, for example 1 kV to 52 kV and/or high voltage, for example 52 kV to 1,200 kV is usually a gas insulated switchgear (GIS). The known GIS comprises a cable compartment, a busbar compartment, a gas exhaust duct, a low voltage compartment and a gas insulated tank.

The cable compartment is a part of the known GIS in which, for example, underground electric cables are connected to the known GIS. The cable compartment is also used to connect electrical loads such as generators, transformers and other loads to each other. Moreover, the cable compartment may comprise current transformers and voltage transformers.

The busbar compartment of the known GIS comprises busbars. A busbar is typically a copper or aluminum electrical conductor which is used to connect the known GIS to other electrical equipment such as generators, transformers and electrical loads. The busbar is arranged, for example, in a gas insulated tank or is insulated by using a solid insulation covering or encapsulating the busbar.

The gas exhaust duct of the known GIS comprises an exhaust path for the removal of hazardous and hot gases generated in case of any fault or abnormal condition within the known GIS. The exhaust path is connected to the outside environment using ducts.

The low voltage compartment of the known GIS comprises control equipment such as relays, auxiliary switches and actuators typically operating at low voltages (less than 1 kV).

The gas insulated tank of the known GIS comprises a circuit breaker and a disconnector unit, for example for one phase, for two phases or for three phases. The circuit breaker is connected to a first electric conductor guided into the gas insulated tank. The disconnector unit is used for connecting or disconnecting the circuit breaker to a second electrical conductor such as a busbar guided to the busbar compartment or the cable compartment in no-load-conditions only. The disconnector unit is used for electrical isolation and grounding during service and maintenance of the GIS. The disconnector unit may comprise three disconnector poles which are movable between two or three contact positions in which they are connected or disconnected to (i) the busbar, (ii) ground or (iii) are disconnected from both. A current path may be provided from the first electric conductor to the second electric conductor by the circuit breaker and the disconnector unit. The circuit breaker and the disconnector unit are connected in series. The circuit breaker is operated to break the current during a normal load condition as well as during a failure in a voltage network in which the known GIS is used. The failure may be a high surge current due to a short circuit or due to lightning strike to the voltage network.

Each disconnector pole of the disconnector unit may be moved between two contact positions or three contact positions, namely a first contact position which is the connected-position (ON), a second contact position which is the disconnected-position (OFF) and a third contact position which is the EARTH-position (EARTH). It is known to arrange three disconnector poles of the disconnector unit in the gas insulated tank. Each disconnector pole corresponds to a phase of a power supply and comprises a polymeric housing, wherein the polymeric housing comprises metal contact units in the form of fingers.

Typically, the disconnector unit known from the prior art involves a polymeric cage in which metallic contact fingers (or copper/aluminium conductors) of all the three phases are arranged or connected suitably. The polymeric cage does not only provide the adequate insulation to avoid discharge among various components, but also provides mechanical support for the metallic contact fingers. In some cases, the polymeric cage is also used to transfer a rotational movement from the mechanism to the metallic contact fingers. However, this kind of disconnector unit has two main disadvantages. First, the polymeric cage increases the electric field in the gas insulating gap between the metallic contact fingers and the polymeric cage, which itself may cause the initiation of a discharge. In order to compensate this, more polymer is used and a creepage length is increased. Second, the polymeric cage is expensive and complex to produce since the production requires moulding dies. Mouldung dies are made for a specific dimension and are not modular. It adds mass to the kinematic chain or to moving elements which need to be moved by a manual/motor operation. Hence, it adds a higher torque requirement. There is also always a possibility of deterioration of a polymeric component by local partial discharges, whose number increases more with additional polymer.

The gas insulating tank of the known GIS comprises an insulating fluid in the form of sulfur hexafluoride ($SF_6$) or other gases in specific applications. The use of $SF_6$ allows for a compact design of the known GIS since $SF_6$ has good properties with respect to dielectric performance and thermal performance, in particular preventing and dealing with unwanted electric discharges, for example arcs, as well as heat dissipation in the known GIS. However, $SF_6$ is a fluorinated gas with a high global warming potential. Therefore, it is not desirable to use $SF_6$. However, it is still desirable to keep the compactness of a GIS comprising $SF_6$, even if other insulation fluids are used.

With respect to the prior art, we refer to U.S. Pat. No. 9,466,955 B2, US 2014/0104758 A1 and U.S. Pat. No. 9,577,412 B2.

For the reasons laid out further above, it is desirable to obtain a compact GIS which enhances the dielectric performance of the disconnector unit. Moreover, it is desirable to reduce the usage of a gas with a high global warming potential such as $SF_6$ or to eliminate the usage of a gas with a high global warming potential.

SUMMARY OF THE INVENTION

According to the invention, this object is solved by a disconnector pole according to claim 1. A disconnector unit according to the invention comprising at least two disconnector poles is given by the features of claim 7. A gas insulated switchgear according to the invention is given by the features of claim 11. Further features of the invention are evident from the following description, the following claims and/or the accompanying figures.

A disconnector pole according to the invention is used for a gas insulated switchgear (GIS). The disconnector pole according to the invention is movable between at least two contact positions. According to a preferred embodiment of the invention, the disconnector pole is movable between at least three contact positions. The contact positions may be a first contact position which is a connected-position (ON), a second contact position which is a disconnected-position (OFF) and a third contact position which is the earth position (EARTH). The disconnector pole according to the invention comprises at least one metallic contact device to be connected to contacts in the two contact positions or in the three contact positions. The metallic contact device may be a metallic contact finger. The metallic contact device comprises an outer surface. Moreover, the disconnector pole according to the invention comprises at least one metallic housing, for example a metallic cage, wherein at least 50% of the entire surface of the metallic contact device is arranged in the metallic housing. As explained further below, a movable part (for example a movable end) of a metallic contact finger is arranged in the metallic housing.

An electric breakdown in gas is initiated when the applied electric field gets higher than the breakdown strength. The aim of the invention is to reduce the electric field for the constraint known in the prior art, in particular with respect to the dimensions of the disconnector pole and the cost for production of the disconnector pole. By using the disconnector pole according to the invention, a good dielectric performance, in particular the capacity of preventing and avoiding unwanted dielectric discharge, is achieved. The disconnector pole according to the invention provides for avoiding dielectric weak regions, for example triple points or a small radius of curvature. Such an advantage allows for the reduction of pressure in a gas insulated tank, thereby reducing the usage of commonly used insulation gas. The disconnector pole according to the invention also provides for the usage of alternative environmental friendly insulation gases such as natural gases.

In the present invention, a disconnector pole and a disconnector unit without any polymeric cage are provided. Instead, the metallic housing is provided which may comprise two metallic (mirrored) components which allow for holding of metallic contact fingers in a position inside a cavity of the metallic housing. Moreover, the invention may provide contact force for the metallic contact fingers, for example by a spring supported at the metallic housing. Additionally, the shape of the metallic housing is optimized to provide dielectric advantage and thereby reducing the electric field in a critical region. Metallic components in the metallic housing may also provide a mirroring effect which brings the electric field lower at a dielectric critical region of metallic contact fingers.

A polymeric insulating rod may be provided which moves three disconnector poles of a disconnector unit. Such a polymeric insulating rod is simple, modular, and less expensive compared to the prior art solution. The polymeric insulating rod may be arranged off axis which provides dielectric and mechanical advantages.

By providing such a disconnector pole in a gas insulated tank of a GIS, the dielectric performance, in particular the capacity of preventing and dealing with unwanted electric discharge, is achieved by enclosing the metallic contact device in the metallic housing. This may lead to a usage of less $SF_6$ or of an alternative gas for insulation. For example, it may also lead to usage of an insulating gas being different from $SF_6$, in particular an insulating gas being more environmentally friendly than $SF_6$. For example, ambient air or nitrogen may be used as the insulating gas.

As mentioned above, an electric breakdown in gas is initiated when the applied electric field gets higher than the breakdown strength. By using the disconnector pole according to the invention, a good dielectric performance, in particular the capacity of preventing and avoiding unwanted dielectric discharge, is achieved. The disconnector pole according to the invention provides for a good handling with dielectric weak regions, for example triple points and small radius of curvature.

In an embodiment of the disconnector pole according to the invention it is additionally or alternatively provided that the metallic housing has an outer surface comprising smooth curvatures. For example, part of the outer surface of the metallic housing may have a radius of curvature greater than 2 mm. Alternatively, the entire outer surface comprises a radius of curvature less than 2 mm. However, the invention is not restricted to such a radius of curvature. Instead, any radius of curvature which is appropriate for the invention may be used. For example, one part of the outer surface of the metallic housing comprises a radius of curvature less than or equal to 2 mm and is positioned in an electric field shadow, whereas another part of the outer surface of the metallic housing comprises a radius of curvature greater than 2 mm.

In an embodiment of the disconnector pole according to the invention it is additionally or alternatively provided that the metallic housing may comprise a surface roughness in the form of the arithmetic mean deviation $R_a$ in the range of about 0.2 μm to 100 μm, wherein the boundaries are included in that range.

The metallic housing is, for example, an aluminum and/or copper and/or silver plated housing. Additionally or alternatively, the metallic contact device is an aluminum and/or copper and/or silver plated contact device. In a further embodiment of the disconnector pole according to the invention, the metallic housing is arranged and extended in such a way that the metallic housing covers the metallic contact device in a critical region such as a tip of a blade and increases the radius of curvature, thereby reducing the electrical field. This increases the dielectric performance.

In an embodiment of the disconnector pole according to the invention it is additionally or alternatively provided that at least 60% or at least 70% or at least 80% of the entire outer surface of the metallic contact device is arranged in the metallic housing.

Furthermore, as mentioned above, it is additionally or alternatively provided in an embodiment of the disconnector pole according to the invention that the disconnector pole is movable between at least three contact positions. The three contact positions are explained above. Each contact position comprises an electrical contact.

In an embodiment of the disconnector pole according to the invention it is additionally or alternatively provided that the metallic contact device comprises at least one first metallic contact unit and at least one second metallic contact unit being separate to the first metallic contact unit. The first metallic contact unit may be a first metallic contact finger. The second metallic contact unit may be a second metallic contact finger. The first metallic contact unit and the second metallic contact unit are arranged opposite to each other in the metallic housing, wherein the first metallic contact unit and the second metallic contact unit touch each other. The first metallic contact unit and the second metallic contact unit may touch each other partly or in their entirety. In an embodiment of the disconnector pole according to the invention it is additionally or alternatively provided that the first metallic contact unit and the second metallic contact unit are arranged at at least one holder, the holder being biased by at least one spring unit. The spring unit may be any kind of suitable spring unit, for example a compression spring and/or a circular spring and/or a leaf spring for each contact. In a further embodiment of the disconnector pole according to the invention it is additionally or alternatively provided that the holder is arranged in at least one first groove arranged at the first metallic contact unit and in at least one second groove arranged at the second metallic contact unit.

In another embodiment of the disconnector pole according to the invention it is additionally or alternatively provided that the metallic contact device comprises at least one first metallic contact unit, at least one second metallic contact unit being separate to the first metallic contact unit, and at least one third metallic contact unit being separate to the first metallic contact unit and the second metallic contact unit. The first metallic contact unit may be a first metallic contact finger. Moreover, the second metallic contact unit may be a second metallic contact finger. Furthermore, the third metallic contact unit may be a third metallic contact finger. The first metallic contact unit and the second metallic contact unit are arranged opposite to each other in the metallic housing, wherein the first metallic contact unit and the second metallic contact unit touch each other. The first metallic contact unit and the second metallic contact unit may touch each other partly or in their entirety. Moreover, the second metallic contact unit and the third metallic contact unit are arranged opposite to each other in the metallic housing, wherein the second metallic contact unit and the third metallic contact unit touch each other. The second metallic contact unit and the third metallic contact unit may touch each other partly or in their entirety. In a further embodiment of the disconnector pole according to the invention it is additionally or alternatively provided that the first metallic contact unit, the second metallic contact unit and the third metallic contact unit are arranged at at least one holder, the holder being biased by at least one spring unit. The spring unit may be any kind of suitable spring unit, for example a compression spring and/or a circular spring and/or a leaf spring for each contact. In another embodiment of the disconnector pole according to the invention it is additionally or alternatively provided that the holder is arranged in at least one first groove arranged at the first metallic contact unit, in at least one second groove arranged at the second metallic contact unit and in at least one third groove arranged at the third metallic contact unit.

In an embodiment of the disconnector pole according to the invention it is additionally or alternatively provided that the metallic housing comprises at least one first housing part and at least one second housing part. The first housing part and the second housing part may have an identical structure. Alternatively, the first housing part may be a mirror element of the second housing part. In other words, the first housing part may be a mirror element of the second housing part mirrored on an axis, for example a vertical axis. A first part of each of the first metallic contact unit, the second metallic contact unit and/or the third metallic contact unit is arranged in the first housing part, whereas a second part of each of the first metallic contact unit, the second metallic contact unit and/or the third metallic contact unit is arranged in the second housing part.

The first housing part and the second housing part may be arranged opposite each other and may be connected to each other, wherein an opening is arranged between the first housing part and the second housing part. The metallic contact device and, therefore, the first metallic contact unit, the second metallic contact unit and/or the third metallic contact unit partly span(s) the opening. It is additionally or alternatively provided in an embodiment of the disconnector pole according to the invention that the first housing part has at least one first wing unit and that the second housing part has at least one second wing unit. The first housing part may comprise two first wing units, whereas the second housing part may comprise two second wing units. The first wing unit and the second wing unit each comprise connecting means for connecting the first housing part to the second housing part. The connecting means may comprise at least one screw connection. The invention is not restricted to a screw connection as the connection means. Instead, any suitable connection means may be used, for example a bolt-nut connection or a welding connection. Additionally, the first wing unit comprises at least one first cut-out, for example a first polygonal and/or circular cut-out, and the second wing unit comprises at least one second cut-out, for example a second polygonal and/or circular cut-out. A rod may be arranged in each of the first cut-out and the second cut-out. For example a polygonal rod may be arranged in each of the first polygonal cut-out and the second polygonal cut-out. Additionally or alternatively, a circular rod may be arranged in each of the first circular cut-out and the second circular cut-out. The rod may be a polymeric insulating rod. The function of the rod is explained later in this specification.

The polygonal cut-outs of the first wing unit and the second wing unit may have, for example, the shape of a triangle, a square, a pentagon or a hexagon. The polygonal rod is shaped to match the shape of the first polygonal cut-out and of the second polygonal cut-out. Therefore, the polygonal rod may have, for example, the shape of a triangle, a square, a pentagon or a hexagon. The invention is not restricted to a polygonal cut-out in each of the first wing unit and the second wing unit. Instead, any suitable shape of the cut-out in the first wing unit and the second wing unit may be used, for example a circular shape. In this case, again, the rod will be shaped to match the shapes of the cut-outs of the first wing unit and the second wing unit, for example circular. It is additionally or alternatively provided in an embodiment of the disconnector pole according to the invention that the connecting means comprise at least one countersunk formation. Moreover, the first cut-out comprises at least one first countersunk formation and the second cut-out comprises at least one second countersunk formation. The first countersunk formation may comprise at least one first chamfer, at least one first roundness and/or at least one first countersunk formation cut-out. Moreover, the second countersunk formation may comprise at least one second chamfer, at least one second roundness and/or at least one second countersunk formation cut-out. The use of the countersunk formation of the connecting means provides an electrical field shadow effect for any connection means made of polymers and metals and, therefore, decreases or avoids a high electric field which might be generated at the connecting means. Moreover, the use of the aforementioned first and second countersunk formations and the use of the chamfers, roundness and cut-outs decreases the number of dielectric failures caused by so called triple points, for example a high electric field generated in the insulation gas and in the region where a metallic component at high voltage is connected to a polymeric element and the insulation gas.

The invention also refers to a disconnector unit comprising at least one first disconnector pole having at least one of the above mentioned or below mentioned features or having a combination of at least two of the above mentioned or below mentioned features. Moreover, the disconnector unit according to the invention also comprises at least one second disconnector pole having at least one of the above mentioned or below mentioned features or having a combination of at least two of the above mentioned or below mentioned features.

It is additionally or alternatively provided in an embodiment of the disconnector unit according to the invention that, as mentioned above, a rod, for example a polygonal rod or a circular rod, is arranged in each of the cut-outs of the wing units of the first and second housing parts of the metallic housing of each one of the first disconnector pole and the second disconnector pole. It is additionally or alternatively provided in an embodiment of the disconnector unit according to the invention that the first disconnector pole and the second disconnector pole are rotatable around a rotation axis and that the rod is arranged at a distance to and parallel to the rotation axis. The distance is, for example, in the range of 5 mm to 800 mm. Using the rod allows for rotating the first disconnector pole and the second disconnector pole together around the rotation axis. The rod may be arranged in the region of a low electric field, for example lower than 1 kV/mm at power frequency voltage. The arrangement of the rod at a distance to and parallel to the rotation axis provides for an unbulky arrangement and, therefore, for the possibility of arranging several disconnector poles in the disconnector unit.

For example, due to the presence of the rod, the first disconnector pole and the second disconnector pole are movable between at least three contact positions. The contact positions may be the first contact position, which is a connected-position (ON), the second contact position, which is a disconnected-position (OFF), and the third contact position, which is the earth position (EARTH).

It is additionally or alternatively provided in an embodiment of the disconnector unit according to the invention that, as mentioned above, the disconnector unit comprises a third disconnector pole having at least one of the above mentioned or below mentioned features or having a combination of at least two of the above mentioned or below mentioned features. It is additionally or alternatively provided in an embodiment of the disconnector unit according to the invention that a rod is arranged in each of the cut-outs of the wing units of the first and second housing parts of the metallic housing of each one of the first disconnector pole, the second disconnector pole and the third disconnector pole. It is additionally or alternatively provided in an embodiment of the disconnector unit according to the invention that the first disconnector pole, the second disconnector pole and the third disconnector pole are rotatable around a rotation axis and that the rod is arranged at a distance to and parallel to the rotation axis. The distance is, for example, in the range of 5 mm to 800 mm. Using the rod allows for the first disconnector pole, the second disconnector pole and the third disconnector pole to rotate around the rotation axis. For example, by using the rod, the first disconnector pole, the second disconnector pole and the third disconnector pole are movable between at least three contact positions. The contact positions may be the first contact position, which is a connected-position (ON), the second contact position, which is a disconnected-position (OFF), and the third contact position, which is the earth position (EARTH).

The rod may be a polymeric insulating rod. It may be arranged in a region having a low electric field (for example lower than 1 kV/mm at power frequency voltage) which decreases the probability of dielectric failures. As mentioned above, the invention is not restricted to a polygonal cut-out in the first wing unit and in the second wing unit of each of the above or below mentioned disconnector poles. Instead, any suitable shape of the cut-out in the first wing unit and the second wing unit may be used, for example a circular shape. The rod will then be shaped to match the shapes of the cut-outs of the first wing unit and the second wing unit of each of the above or below mentioned disconnector poles.

The invention also refers to a gas insulated switchgear (GIS) comprising at least one disconnector pole having at least one of the above mentioned or below mentioned features or having a combination of at least two of the above mentioned or below mentioned features. Additionally or alternatively, the GIS according to the invention may comprise at least one disconnector unit having at least one of the above mentioned or below mentioned features or having a combination of at least two of the above mentioned or below mentioned features.

BRIEF DESCRIPTION OF THE DRAWINGS

Embodiments of the invention described herein will be explained in more detail in the following text with reference to the figures, in which:

FIG. 1 shows a schematic view of a gas insulated tank 100 of a gas insulated switchgear 1000 according to the invention. A disconnector unit 200 and a circuit breaker unit 300 are arranged in the gas insulated tank 100. The disconnector unit 200 is connected to the circuit breaker unit 300 by a first electrical conducting unit 201, a second electrical conducting unit 202 and a third electrical conducting unit 203. This will be explained in further detail below. The first electrical conducting unit 201, the second electrical conducting unit 202 and the third electrical conducting unit 203 may be any kind of conducting unit suitable for the invention. For example, at least one of the first electrical conducting unit 201, the second electrical conducting unit 202 and the third electrical conducting unit 203 is a busbar. In particular, the first electrical conducting unit 201, the second electrical conducting unit 202 and/or the third electrical conducting unit 203 is a copper and/or aluminum conductor.

Figure 2:
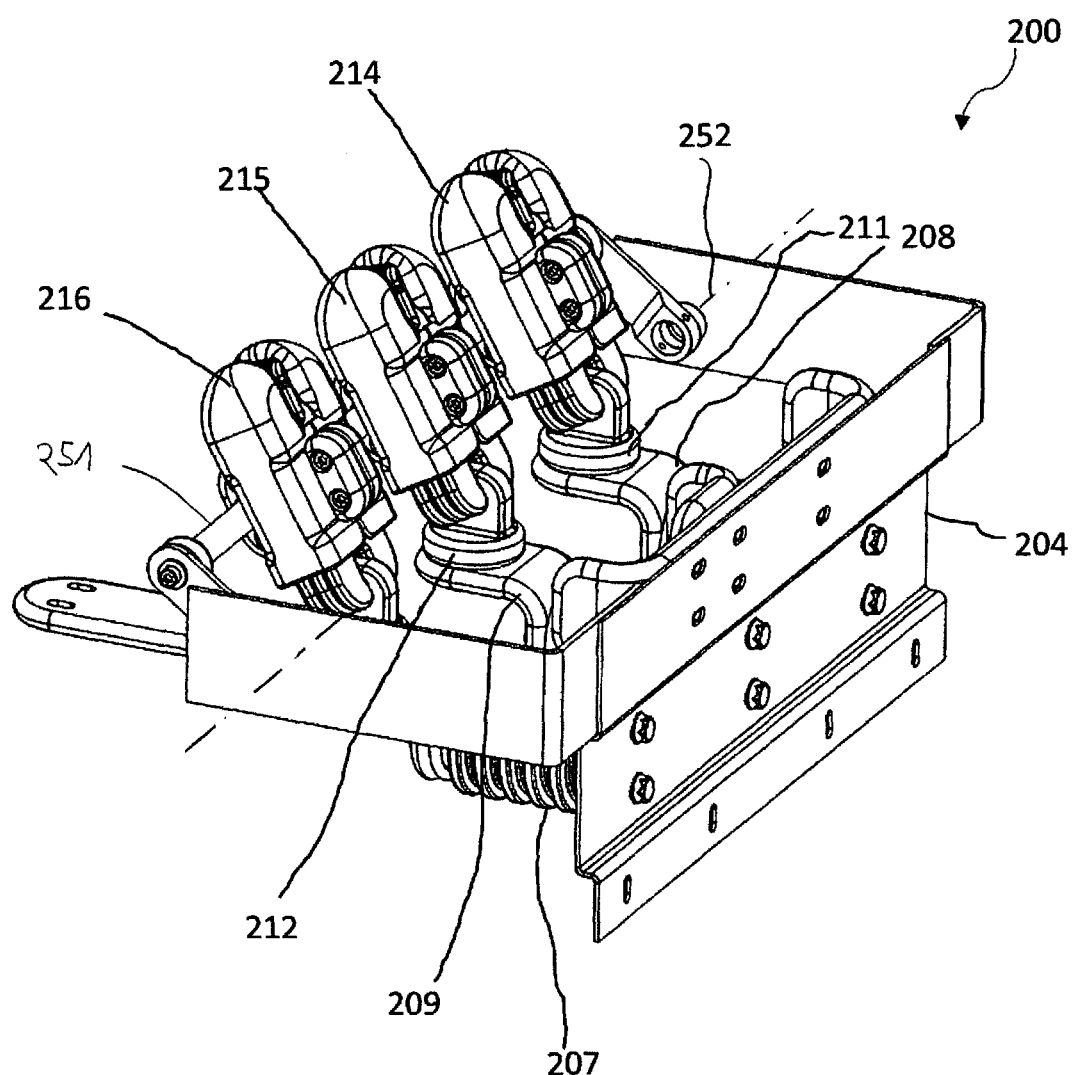
FIG. 2 shows a first schematic view of a disconnector unit.
Figure 3:
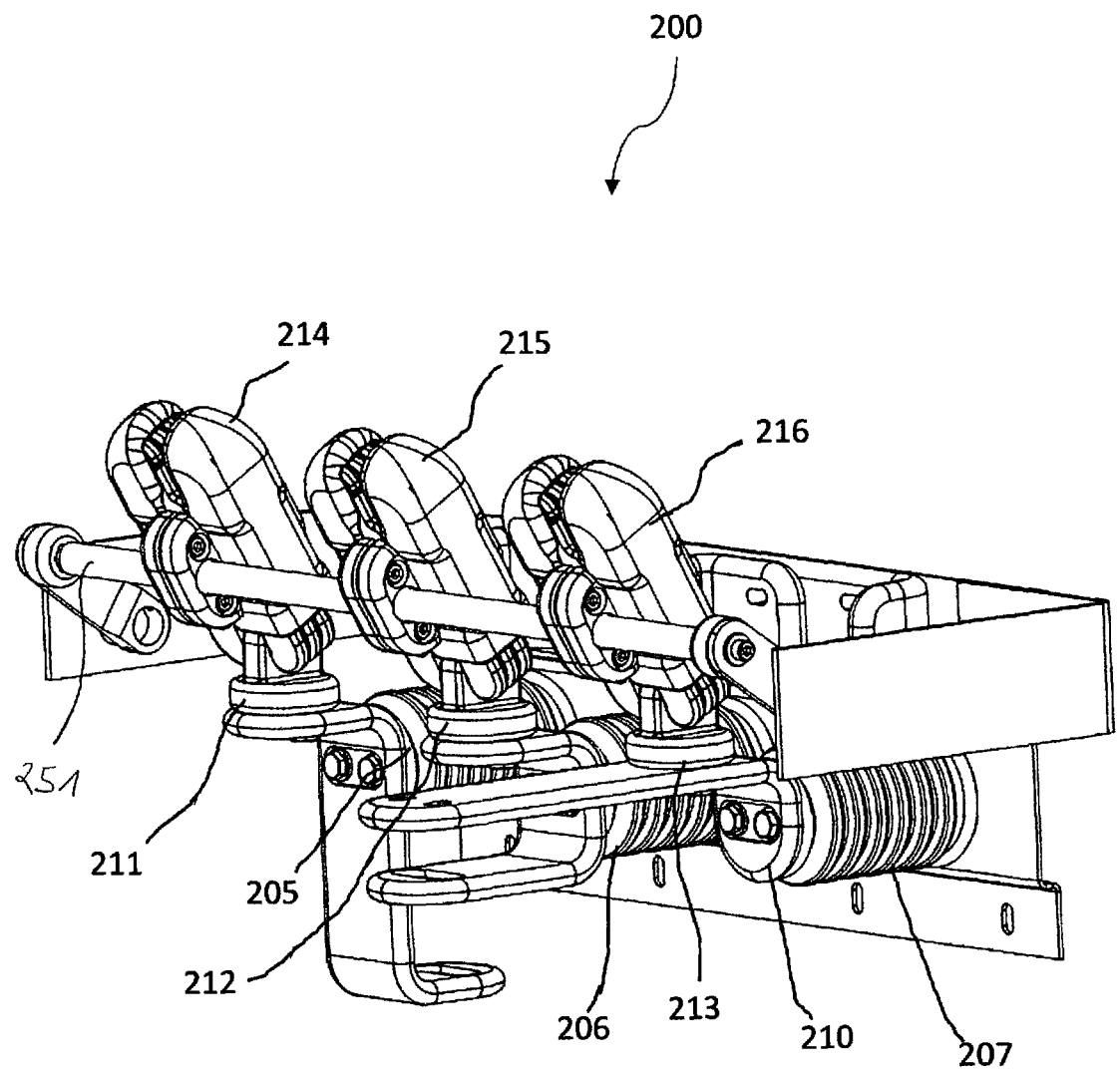
FIG. 3 shows a second schematic view of the disconnector unit according to FIG. 2.
Figure 4:
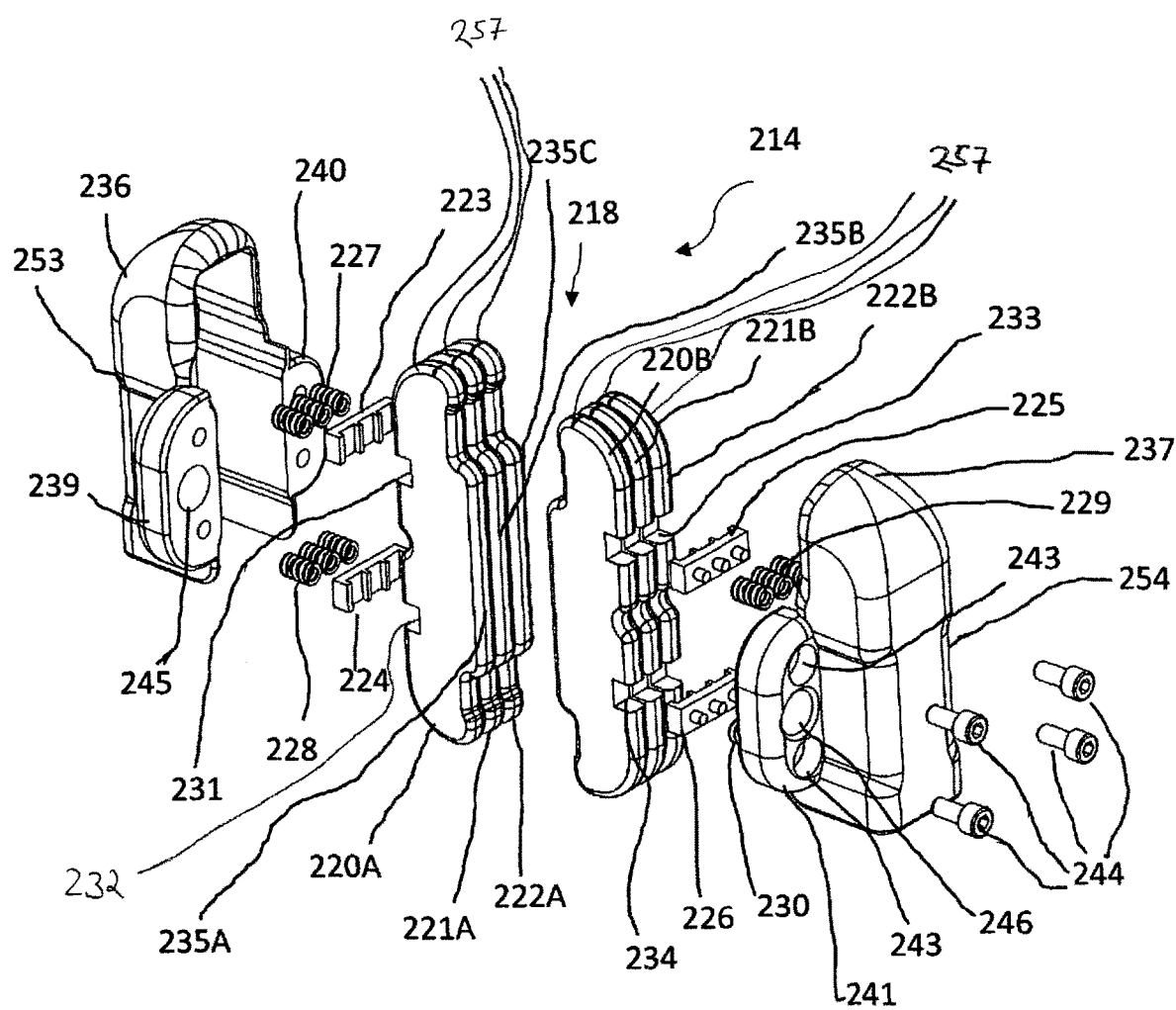
FIG. 4 shows a disassembled metallic housing and a metallic contact device of a disconnector pole.
Figure 5:
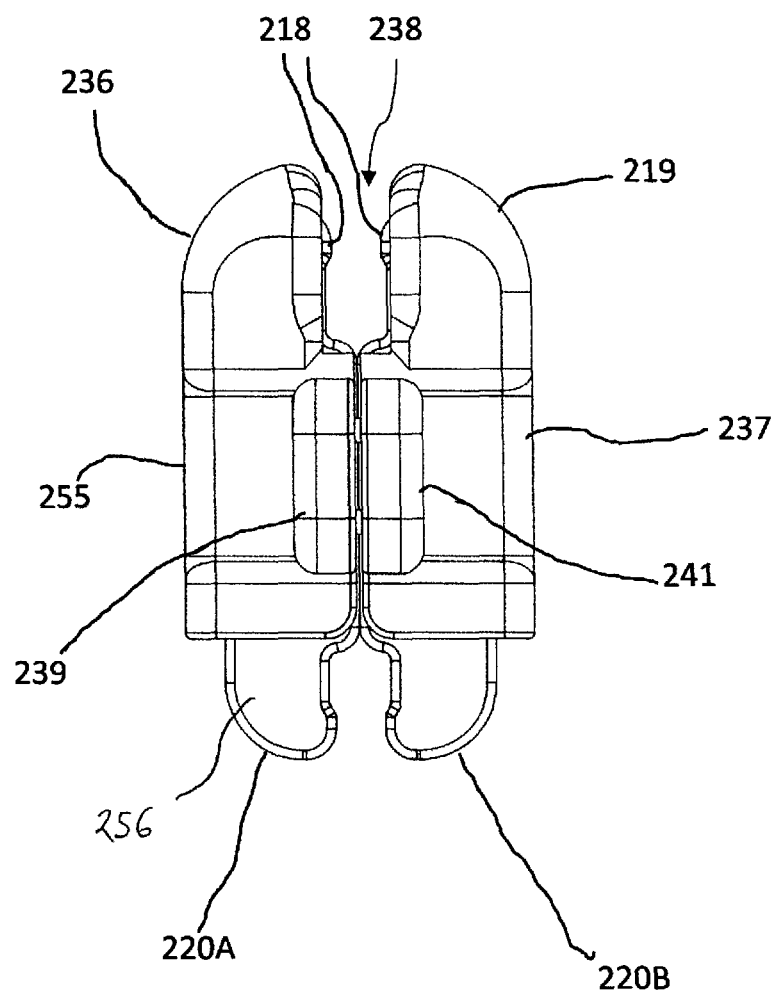
FIG. 5 shows a front view of the disconnector pole according to FIG. 4.
Figures 6, 7:
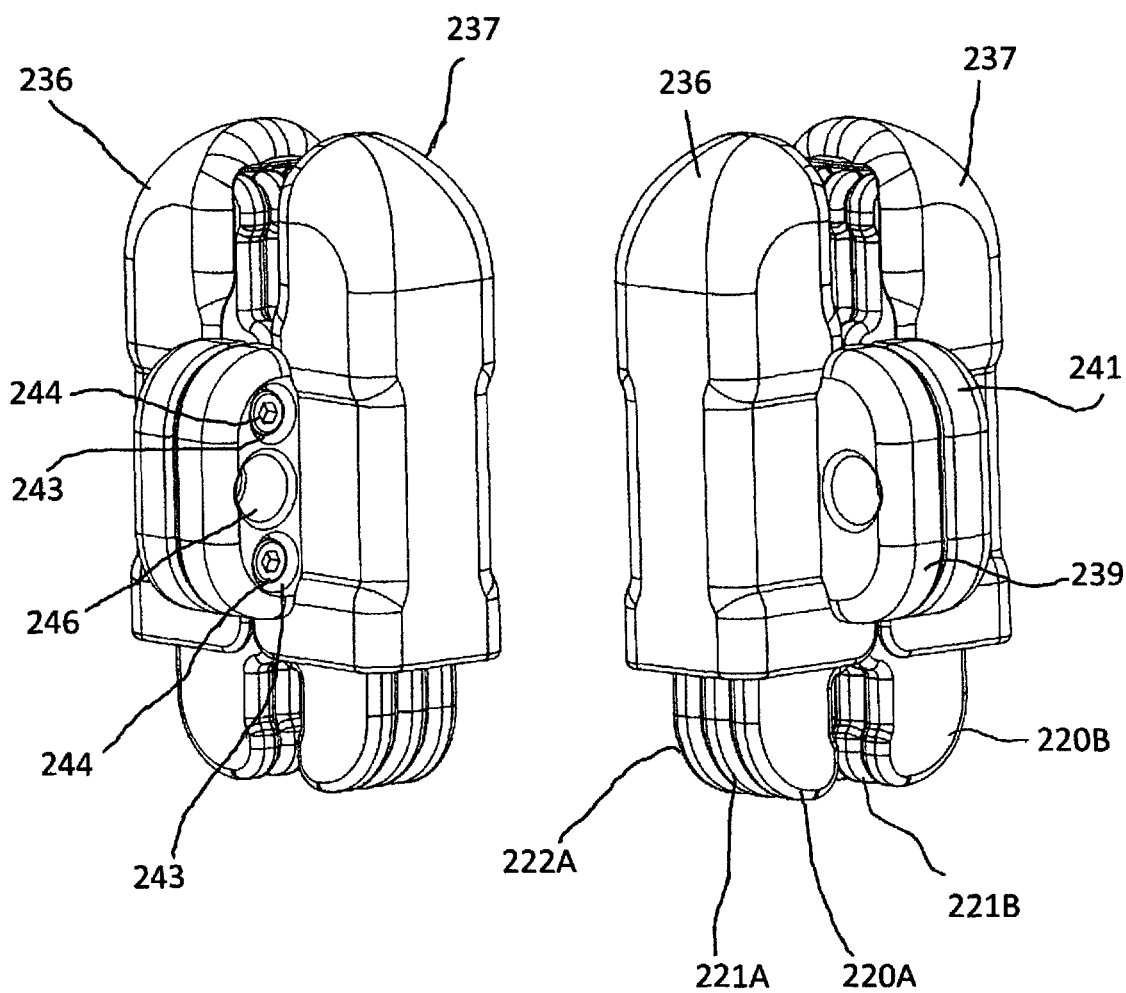
FIG. 6 shows a first schematic view of the disconnector pole according to FIG. 4.
FIG. 7 shows a second schematic view of the disconnector pole according to FIG. 4.
Figure 8:
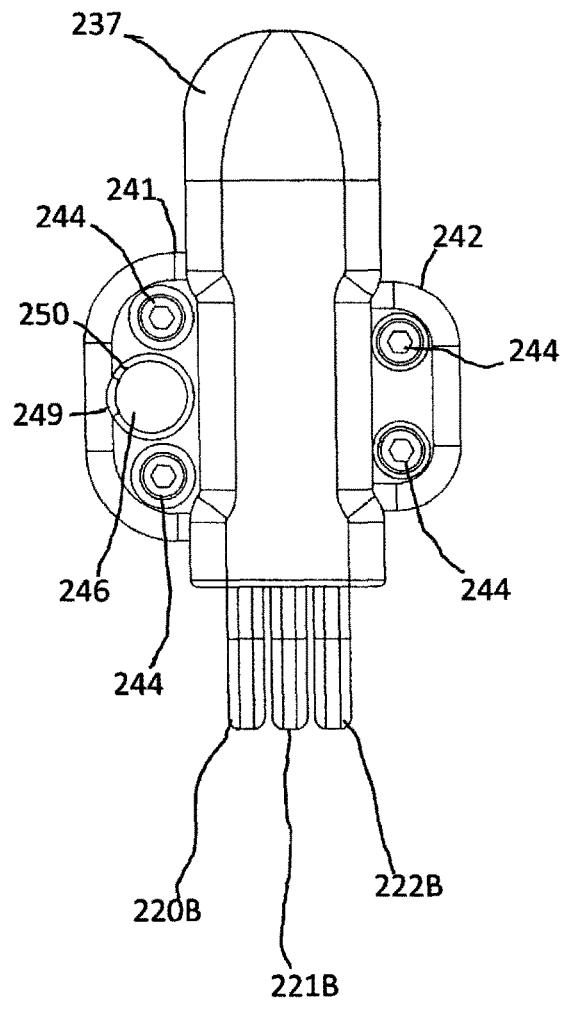
FIG. 8 shows a side view of the disconnector pole according to FIG. 4.
Figure 9:
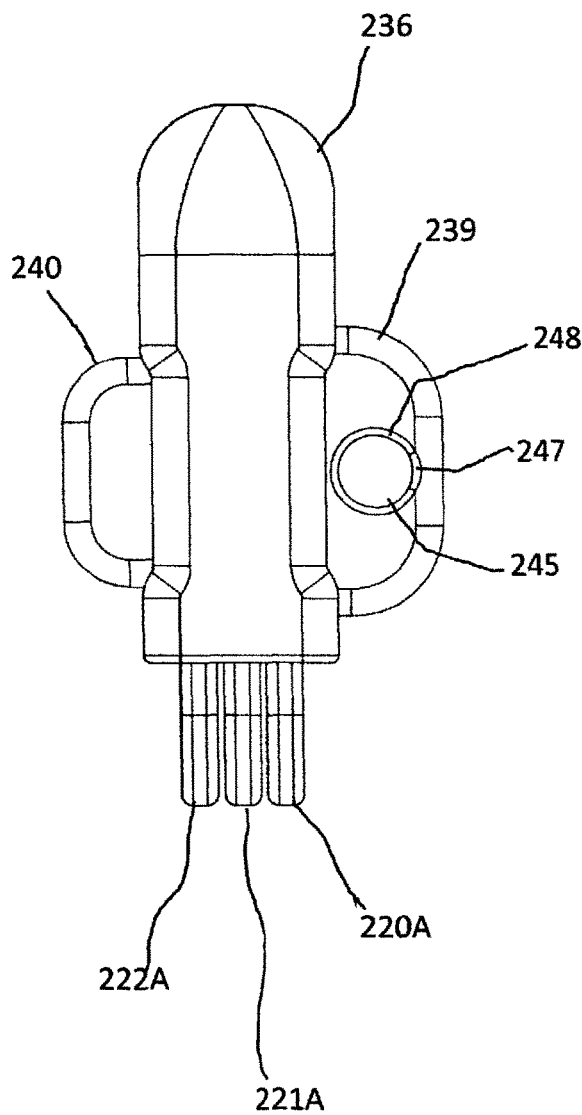
FIG. 9 shows a further side view of the disconnector pole according to FIG. 4.

The disconnector unit 200 according to the invention is now explained. The disconnector unit 200 is shown in particular in FIGS. 2 and 3. The disconnector unit 200 is arranged on a mounting unit 204. The mounting unit 204 may be a stainless steel sheet. A first disconnector insulator 205, a second disconnector insulator 206 and a third disconnector insulator 207 are mounted at the mounting unit 204. The first disconnector insulator 205, the second disconnector insulator 206 and the third disconnector insulator 207 may be standard cylindrical insulators known in the art.

The first disconnector insulator 205 is arranged at and is mechanically connected to a first electrical conductor 208. The first electrical conductor 208 is arranged at and is conductively connected to a first contact unit 211. A first disconnector pole 214 is arranged at and is conductively connected to the first contact unit 211. The first contact unit 211 may be a pivoting contact. In other words, the first disconnector pole 214 may be rotated around a rotation axis 252, which is aligned perpendicular to a surface of the first contact unit 211.

The second disconnector insulator 206 is arranged at and is mechanically connected to a second electrical conductor 209. The second electrical conductor 209 is arranged at and is conductively connected to a second contact unit 212. A second disconnector pole 215 is arranged at and is conductively connected to the second contact unit 212. The second contact unit 212 may also be a pivoting contact. In other words, the second disconnector pole 215 may be rotated around the above mentioned rotation axis 252, which is aligned perpendicular to a surface of the second contact unit 212.

The third disconnector insulator 207 is arranged at and is mechanically connected to a third electrical conductor 210. The third electrical conductor 210 is arranged at and is conductively connected to a third contact unit 213. A third disconnector pole 216 is arranged at and is conductively connected to the third contact unit 213. The third contact unit 213 may also be a pivoting contact. In other words, the third switch 216 may be rotated around the above mentioned rotation axis 252, which is aligned perpendicular to a surface of the third contact unit 213.

If a three phase power system is used, each of the above mentioned disconnector poles 214, 215 and 216 is used for a different phase of the current. In other words, the first disconnector pole 214 is used for a first phase of the current, the second disconnector pole 215 is used for a second phase of the current and the third disconnector pole 216 is used for a third phase of the current.

Figure 1:
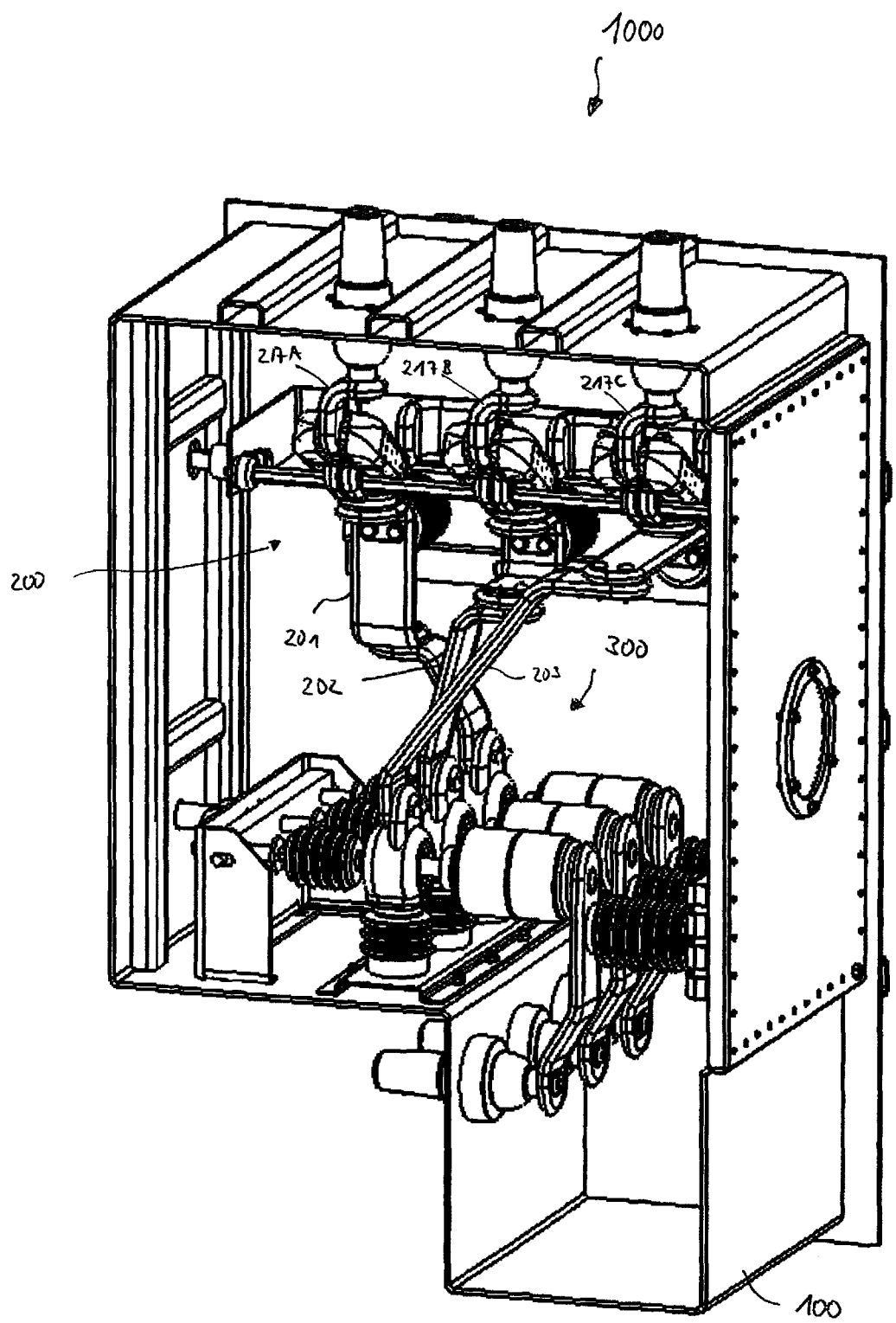
FIG. 1 shows a schematic view of a gas insulated tank of a gas insulated switchgear.

Each disconnector pole 214, 215 and 216 is movable between at least two contact positions. In the embodiment shown in FIGS. 1 to 3, each disconnector pole 214, 215 and 216 is movable between at least three contact positions. The contact positions are a first contact position, which is a connected-position (ON), a second contact position, which is a disconnected-position (OFF), and a third contact position, which is the earth position (EARTH). FIG. 1 shows a first contact 217A of the first contact position of the first disconnector pole 214, a second contact 217B of the first contact position of the second disconnector pole 215 and a third contact 217C of the first contact position of the third disconnector pole 216.

The first disconnector pole 214 is now explained in detail with respect to FIGS. 4 to 9. Since the second disconnector pole 215 and the third disconnector pole 216 are identical to the first disconnector pole 214 with respect to their structure, the following also applies to the second disconnector pole 215 and to the third disconnector pole 216.

The first disconnector pole 214 comprises a metallic contact device 218 and a metallic housing 219. The metallic contact device 218 comprises several metallic contact units, each metallic contact unit having a first part and a second part. Each metallic contact unit may be a contact finger and the arrangement of the metallic contact device 218 and the metallic housing 219 may be a finger packet. In particular, the metallic contact device 218 comprises a first metallic contact unit having a first part 220A and a second part 220B, a second metallic contact unit having a first part 221A and a second part 221B and a third metallic contact unit having a first part 222A and a second part 222B. The first part 220A and the second part 220B of the first metallic contact unit are arranged opposite each other and are conductively connected to each other at a first middle section 235A. The first part 221A and the second part 221B of the second metallic contact unit are arranged opposite each other and are conductively connected to each other at a second middle section 235B. The first part 222A and the second part 222B of the third metallic contact unit are arranged opposite each other and are conductively connected to each other at a third middle section 235C.

The first part 220A of the first metallic contact unit and the first part 221A of the second metallic contact unit are arranged opposite to each other in the metallic housing 219, wherein the first part 220A of the first metallic contact unit and the first part 221A of the second metallic contact unit touch each other or are arranged at a distance to each other. The distance is provided by holders and grooves as mentioned below. Moreover, the second part 220B of the first metallic contact unit and the second part 221B of the second metallic contact unit are arranged opposite to each other in the metallic housing 219, wherein the second part 220B of the first metallic contact unit and the second part 221B of the second metallic contact unit touch each other or are arranged at a distance to each other. The distance is provided by holders and grooves as mentioned below.

Furthermore, the first part 221A of the second metallic contact unit and the first part 222A of the third metallic contact unit are arranged opposite to each other in the metallic housing 219, wherein the first part 221A of the second metallic contact unit and the first part 222A of the third metallic contact unit touch each other or are arranged at a distance to each other. The distance is provided by holders and grooves as mentioned below. Moreover, the second part 221B of the second metallic contact unit and the second part 222B of the third metallic contact unit are arranged opposite to each other in the metallic housing 219, wherein the second part 221B of the second metallic contact unit and the second part 222B of the third metallic contact unit touch each other or are arranged at a distance to each other. The distance is provided by holders and grooves as mentioned below.

The first part 220A of the first metallic contact unit, the first part 221A of the second metallic contact unit and the first part 222A of the third metallic contact unit are arranged at a first holder 223 and a second holder 224. The first holder 223 is arranged in a first groove 231 which extends along the first part 220A of the first metallic contact unit, the first part 221A of the second metallic contact unit and the first part 222A of the third metallic contact unit. Moreover, the second holder 224 is arranged in a second groove 232 which extends along the first part 220A of the first metallic contact unit, the first part 221A of the second metallic contact unit and the first part 222A of the third metallic contact unit. The first holder 223 is biased by a first spring unit 227 comprising three coil springs arranged in a first housing part 236 of the metallic housing 219. The second holder 224 is biased by a second spring unit 228 comprising three coil springs arranged in the first housing part 236 of the metallic housing 219.

The second part 220B of the first metallic contact unit, the second part 221B of the second metallic contact unit and the second part 222B of the third metallic contact unit are arranged at a third holder 225 and a fourth holder 226. The third holder 225 is arranged in a third groove 233 which extends along the second part 220B of the first metallic contact unit, the second part 221B of the second metallic contact unit and the second part 222B of the third metallic contact unit. Moreover, the fourth holder 226 is arranged in a fourth groove 234 which extends along the second part 220B of the first metallic contact unit, the second part 221B of the second metallic contact unit and the second part 222B of the third metallic contact unit. The third holder 225 is biased by a third spring unit 229 comprising three coil springs arranged in a second housing part 237 of the metallic housing 219. The fourth holder 226 is biased by a fourth spring unit 230 comprising three coil springs arranged in the second housing part 237 of the metallic housing 219.

As mentioned above, each of the spring units 227 to 230 comprises three coil springs. However, the invention is not restricted to such a structure of the spring units. Rather, any structure of the spring units suitable for the invention may be used. For example, the spring unit may comprise any kind of compression spring and/or a circular spring and/or a leaf spring for each contact.

As shown in FIGS. 4 to 9 and as mentioned above, the metallic housing 219 of the first disconnector pole 214 comprises the first housing part 236 and the second housing part 237. An opening 238 is arranged between the first housing part 236 and the second housing part 237, wherein the metallic contact device 218 partly spans the opening 238.

The first part 220A of the first metallic contact unit, the first part 221A of the second metallic contact unit and the first part 222A of the third metallic contact unit are arranged in the first housing part 236, whereas the second part 220B of the first metallic contact unit, the second part 221B of the second metallic contact unit and the second part 222B of the third metallic contact unit are arranged in the second housing part 237.

The first housing part 236 has a first wing unit 239 and a further first wing unit 240, both wing units 239, 240 extending from a first main body 253 of the first housing part 236 in opposite directions. Moreover, the second housing part 237 has a second wing unit 241 and a further second wing unit 242, both wing units 241, 242 extending from a second main body 254 of the second housing part 237 in opposite directions. The first wing unit 239, the further first wing unit 240, the second wing unit 241 and the further second wing unit 242 each comprise connecting means for connecting the first housing part 236 to the second housing part 237. In particular, the second wing unit 241 and the further second wing unit 242 comprise countersunk formations 243 for screws 244. The countersunk formations 243 provide for an electrical shadow effect for the screws 244 and, therefore, decrease or avoid a high electric field which might be generated at the screws 244. The screws 244 are inserted into threads arranged at the first wing unit 239 and the further first wing unit 240.

The first wing unit 239 comprises a first cut-out 245, for example a circular cut-out, and the second wing unit 241 comprises a second cut-out 246, for example a circular cut-out. The invention is not restricted to circular cut-outs 245, 246 in the first wing unit 239 and in the second wing unit 241, respectively. Instead, any suitable shape of the cut-outs in the first wing unit 239 and the second wing unit 241 may be used, for example a polygonal shape. The cut-outs 245, 246 of the first wing unit 239 and the second wing unit 241, respectively, may have, for example, the shape of a triangle, a square, a pentagon or a hexagon.

The first cut-out 245 comprises a first countersunk formation 247 and the second cut-out 246 comprises a second countersunk formation 249. The first countersunk formation 247 comprises a first chamfer 248 and/or a roundness and or a cut-out. Moreover, the second countersunk formation 249 comprises a second chamfer 250 and/or a roundness and or a cut-out.

As mentioned above, the structures of the first disconnector pole 214, the second disconnector pole 215 and the third disconnector pole 216 are identical. Therefore, each disconnector pole 214 to 216 comprises the cut-outs. As shown in particular in FIGS. 2 and 3, a rod 251, for example a polymeric insulating rod, is arranged in each of the first cut-outs and each of the second cut-outs of all three disconnector poles 214 to 216. The rod 251 is shaped to match the shapes of the first cut-outs and of the second cut-outs. Therefore, the rod 251 may have, for example, a circular or a polygonal shape, such as a shape of a triangle, a square, a pentagon or a hexagon. The first disconnector pole 214, the second disconnector pole 215 and the third disconnector pole 216 are rotatable around the above mentioned rotation axis 252. The rod 251 is arranged at a distance to and parallel to the rotation axis 252 which allows to increase the number of metallic contact units (fingers) in comparison to the prior art. Moreover, using the rod 251 allows for the first disconnector pole 214, the second disconnector pole 215 and the third disconnector pole 216 to rotate around the rotation axis 252. For example, due to the presence of the rod 251, the first disconnector pole 214, the second disconnector pole 215 and the third disconnector pole 216 are movable between the three contact positions.

The rod 251 is arranged in a region having a low electric field (for example lower than 1 kV/mm at power frequency voltage), which decreases the probability of dielectric failures. Moreover, the use of the aforementioned first and second counter sunk formations 247, 249 and the use of the first and second chamfers 248, 250 decreases the number of dielectric failures caused by so called triple points, for example a high electric field generated in the insulation gas and at the region where a metallic component at high voltage is connected to a polymeric element and the insulation gas.

The metallic housing 219 has an outer surface 255 comprising smooth curvatures. For example, the outer surface 255 of the metallic housing 219 comprises a part of the outer surface 255, the part having a radius of curvature greater than 2 mm. Alternatively, the entire outer surface 255 has a radius of curvature less than 2 mm. However, the invention is not restricted to such a radius of curvature. Instead, any radius of curvature which is appropriate for the invention may be used. For example, one part of the outer surface 255 of the metallic housing 219 has a radius of curvature less than or equal to 2 mm but is positioned in an electric field shadow, whereas another part of the outer surface 255 of the metallic housing 219 has a radius of curvature greater than 2 mm.

The metallic housing 219 also comprises a surface roughness in the form of the arithmetic mean deviation $R_a$ in the range of about 0.2 μm to 100 μm, wherein the boundaries are included in that range.

The metallic housing 219 is, for example, an aluminum and/or copper and/or silver plated housing. Additionally or alternatively, the metallic contact device 219 is an aluminum and/or copper and/or silver plated contact device.

The metallic contact device 218 comprises an outer surface 256. At least 50% of the entire outer surface 256 of the metallic contact device 218 is arranged in the metallic housing 219. For example, at least 60% or at least 70% or at least 80% of the entire outer surface 256 of the metallic contact device 218 is arranged in the metallic housing 219. Moreover, the metallic housing 219 is arranged and extended in such a way that it covers the metallic contact device 218 in critical regions such as a tip of a blade 257 (see, for example, FIG. 4) and increases the radius of curvature, hereby reducing the electric field. The dielectric performance, in particular the capacity of preventing and dealing with unwanted electric discharge, is achieved by enclosing the metallic contact device 218 in the metallic housing 219.

By providing the disconnector poles 214, 215, and 216 in the gas insulated tank 100 of the GIS 1000 it is possible to reduce the quantity of an insulating gas such as $SF_6$ and, thereby, to reduce adverse environment effects from this gas. Alternatively, a more environment friendly gas having a relatively less dielectric strength can be used as an insulating gas. For example, a natural gas such as ambient air, carbon-dioxide or nitrogen may be used as the insulating gas.

As mentioned above, the invention also refers to a circuit breaker unit 300 comprising circuit breakers 300A. For example, the circuit breaker unit 300 comprises three circuit breakers 300A, namely a first circuit breaker, a second circuit breaker and a third circuit breaker. The three circuit breakers 300A have an identical structure, which is now explained.

Figure 10:
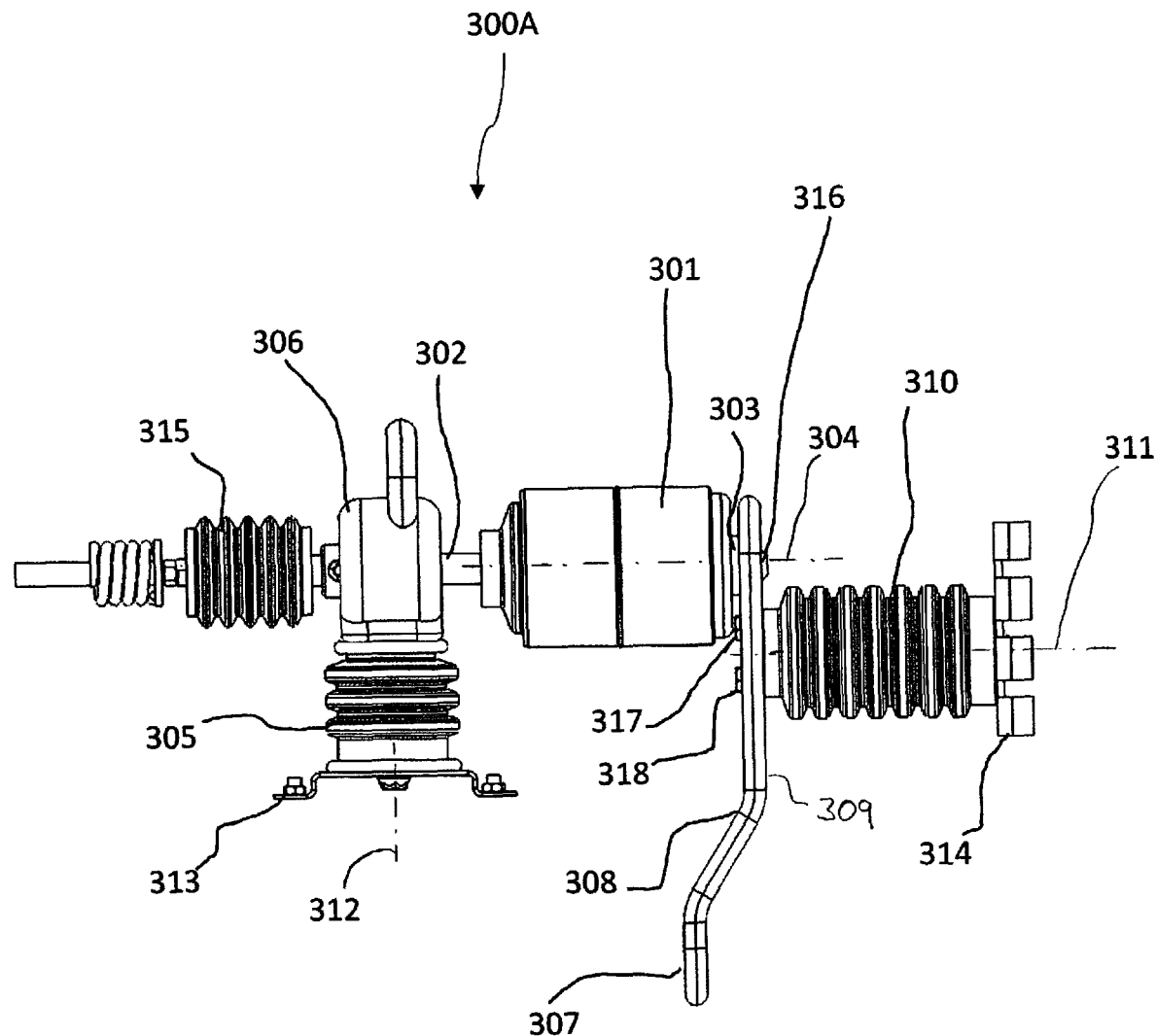
FIG. 10 shows a side view of a first embodiment of a circuit breaker.
Figure 11:
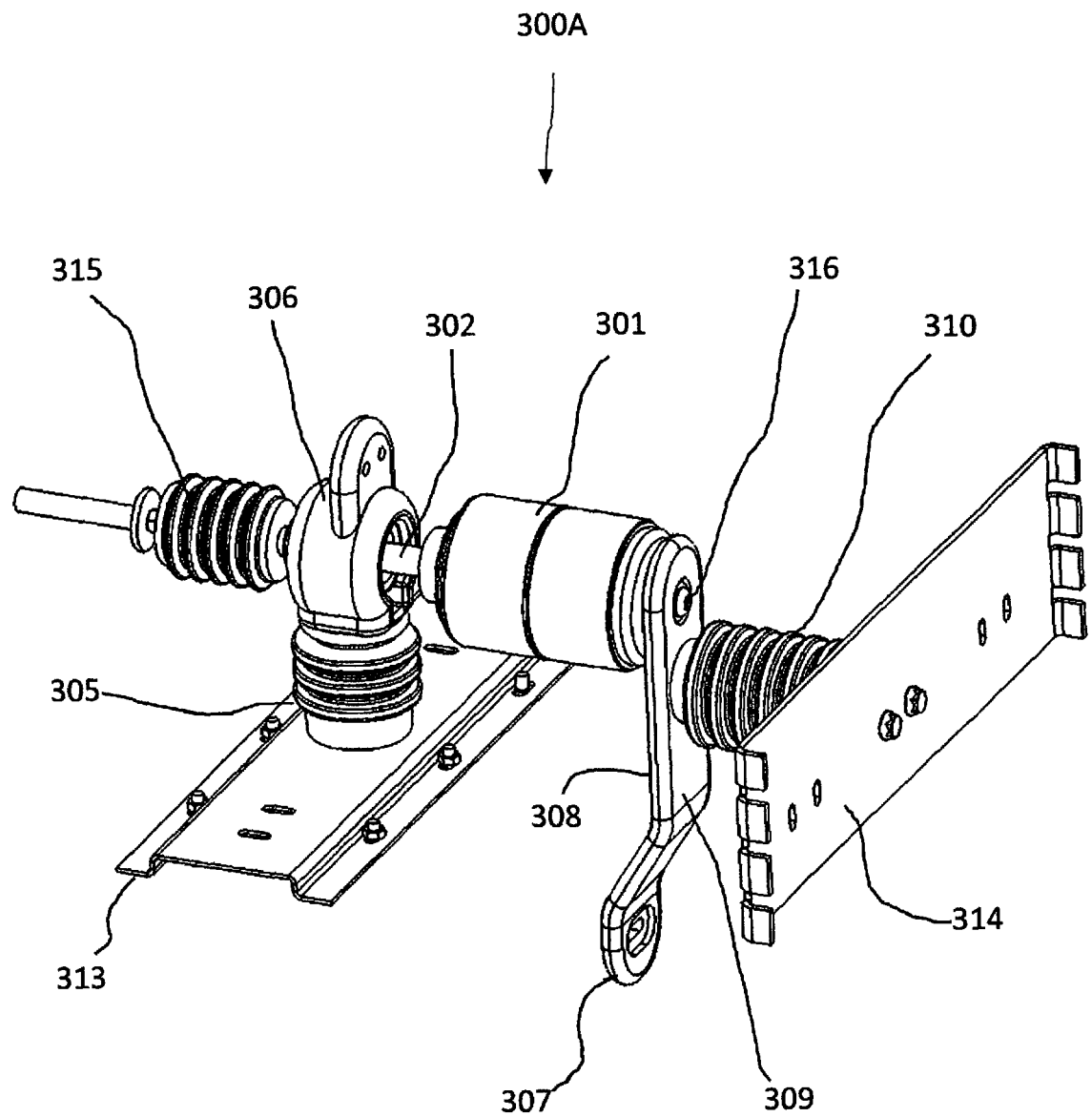
FIG. 11 shows a schematic view of the circuit breaker according to FIG. 10.
Figure 12:
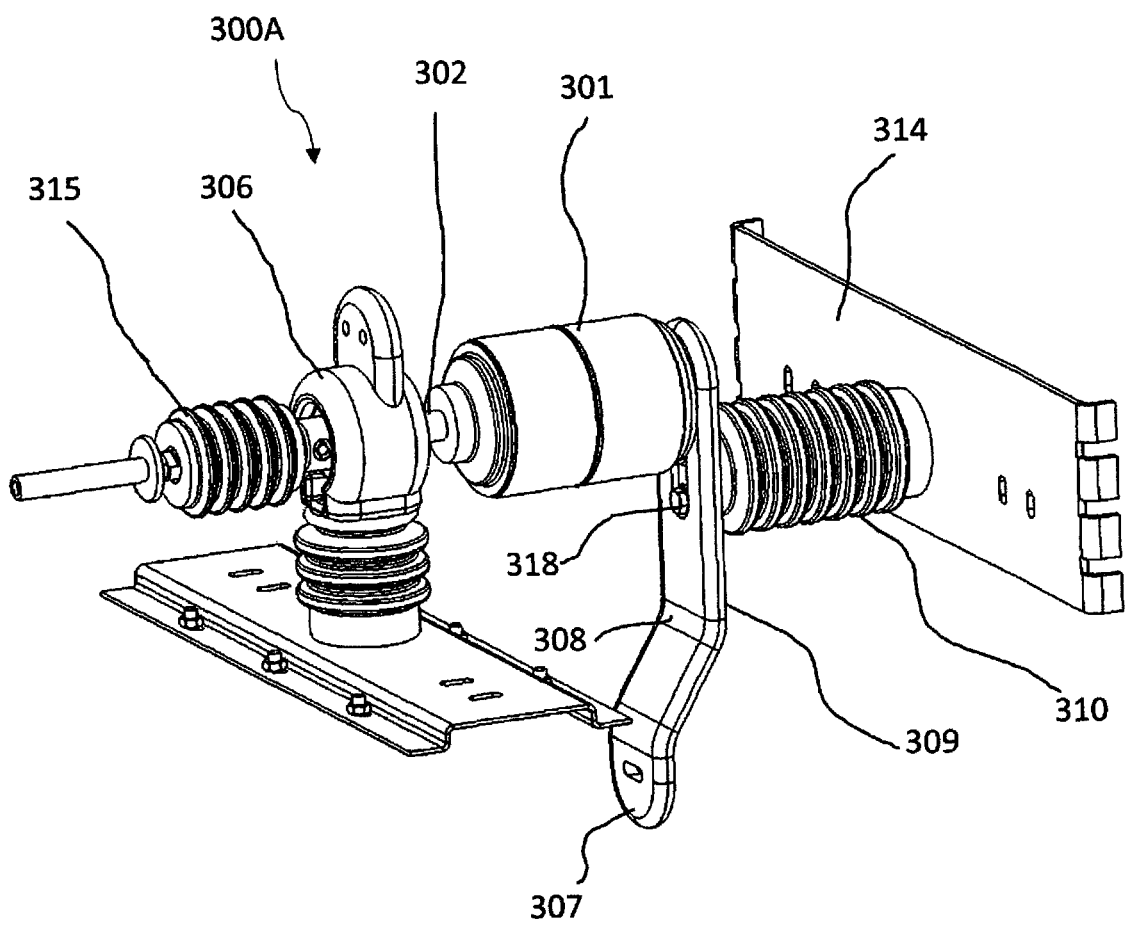
FIG. 12 shows a further schematic view of the circuit breaker according to FIG. 10.

A first embodiment of the circuit breaker 300A is shown in FIGS. 10 to 12. The circuit breaker 300A comprises a vacuum interrupter 301 comprising a first movable contact 302, a second stationary contact 303 and a first center axis 304. Moreover, the circuit breaker 300A comprises a first insulator 305 and a contact unit 306 arranged at the first insulator 305. The first movable contact 302 is movable to the contact unit 306 to be connected to the contact unit 306. The first movable contact 302 is moved by an actuating mechanism, for example a mechanical and/or an electronic mechanism (not shown in FIGS. 10 to 12). The first movable contact 302 is movable in an open position and in a closed position by the actuating mechanism. The first movable contact 302 contacts the contact unit 306 in the closed position.

The contact unit 306 is a metallic contact unit, for example, a copper unit and/or an aluminum unit. Moreover, the first movable contact 302 is a metallic movable contact, for example a copper contact and/or an aluminum contact. Furthermore, the second stationary contact 303 is a metallic stationary contact, for example a copper contact and/or an aluminum contact.

Furthermore, the circuit breaker 300A according to FIGS. 10 to 12 comprises a busbar 307. The busbar 307 is an electrical conductor, in particular a metallic conductor. For example, the busbar 307 is a copper and/or an aluminum conductor. It may have a flat shape. In other words, it may have a thickness of about 1 mm to 100 mm. The busbar 307 comprises a first side 308 and a second side 309. The first side 308 of the busbar 307 and the second side 309 of the busbar 307 are arranged opposite to each other. The first side 308 of the busbar 307 is at a distance to the second side 309 of the busbar 307. The distance between the first side 308 and the second side 309 of the busbar 307 is in the range of 1 mm to 100 mm, wherein the boundaries are within the aforementioned range. Moreover, the first side 308 and the second side 309 of the busbar 307 are arranged parallel to each other.

The vacuum interrupter 301 of the circuit breaker 300A is arranged at the first side 308 of the busbar 307. The vacuum interrupter 301 is conductively mounted to the busbar 307 using a connection means, for example a screw 316.

The circuit breaker 300A also comprises a second insulator 310. The second insulator 310 is arranged at the second side 309 of the busbar 307. The second insulator 310 is mechanically connected to the busbar 307 using a first screw 317 and a second screw 318. Accordingly, the second insulator 310 is also mechanically connected to the second stationary contact 303 of the vacuum interrupter 301.

The second insulator 310 has a second center axis 311. The second center axis 311 of the second insulator 310 is parallel to the first center axis 304 of the vacuum interrupter 301.

The vacuum interrupter 301 is a cylindrical interrupter, wherein the first center axis 304 is a first cylindrical axis. Moreover, the second insulator 310 is a cylindrical insulator, wherein the second center axis 311 is a second cylindrical axis. The first insulator 305 is also a cylindrical insulator. The first insulator 305 has a third center axis 312, namely a third cylindrical axis.

The first center axis 304 of the vacuum interrupter 301 and the second center axis 311 of the second insulator 310 are horizontally aligned. Moreover, the third center axis 312 of the first insulator 305 is vertically aligned.

The first insulator 305 is arranged at a first support device 313. Moreover, the second insulator 310 is arranged at a second support device 314. The first support device 313 and/or the second support device 314 may be any kind of support device which is suitable for the circuit breaker 300A. In particular, the first support device 313 and/or the second support device 314 may each be a metallic plate, for example a steel and/or an aluminum plate.

The contact unit 306 is also arranged at an insulating push rod 315. The insulating push rod 315 has a fourth center axis. The fourth center axis is collinear with the first center axis 304 of the vacuum interrupter 301. Therefore, the fourth center axis of the insulating push rod 315 is also parallel to the second center axis 311 of the second insulator 310.

The circuit breaker 300A has the advantage that it provides for a good structure support of the vacuum interrupter 301, in particular due to the alignment of the second center axis 311 of the second insulator 310 to the first center axis 304 of the vacuum interrupter 301. Moreover, the circuit breaker 300A may be less expensive to manufacture than the circuit breaker known from the prior art since the circuit breaker 300A according to the invention does not use a complex polymeric holding device for holding the vacuum interrupter 301. Rather, the circuit breaker 300A according to the invention uses a simple alignment structure of the first center axis 304 of the vacuum interrupter 301 and the second center axis 311 of the second insulator 310. Moreover, the circuit breaker 300A provides for no encapsulation or enclosure of the vacuum interrupter 301. Therefore, no polymeric frame or polymeric components surround the vacuum interrupter 301, in particular at a distance, for example, in the range of 0.1 mm to 300 mm from the vacuum interrupter 301. Therefore, the electric field around the vacuum interrupter 301 is homogenous and leads to less dielectric failures. Moreover, as mentioned above, cylindrical insulators are used. These are inexpensive, modular and easy to manufacture. Therefore, the use of such cylindrical insulators reduces the costs of manufacturing the circuit breaker 300A in comparison to the circuit breakers known from the prior art. Additionally, the circuit breaker 300A according to the invention has a compact design.

Figure 13:
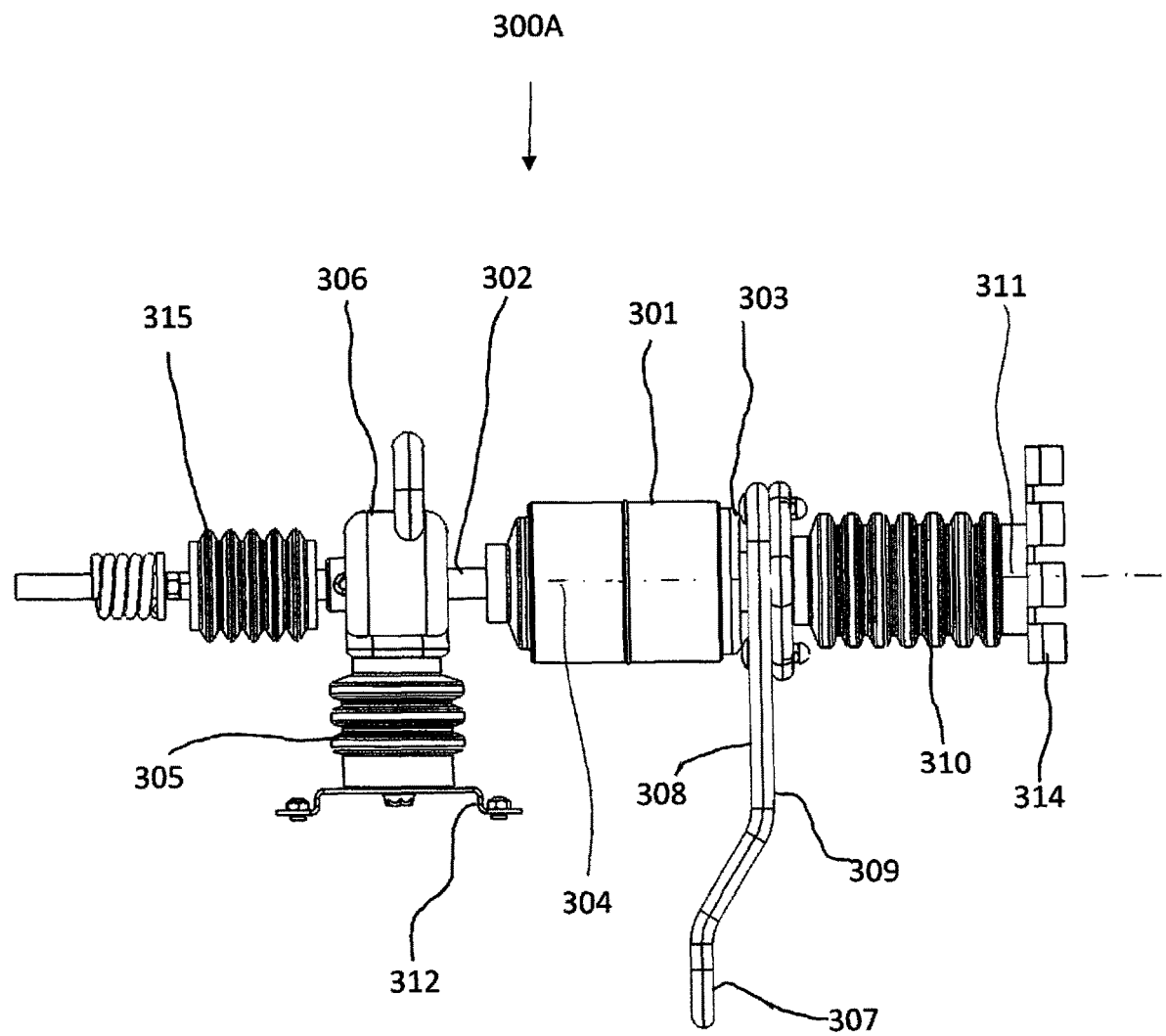
FIG. 13 shows a side view of a second embodiment of a circuit breaker.
Figure 14:
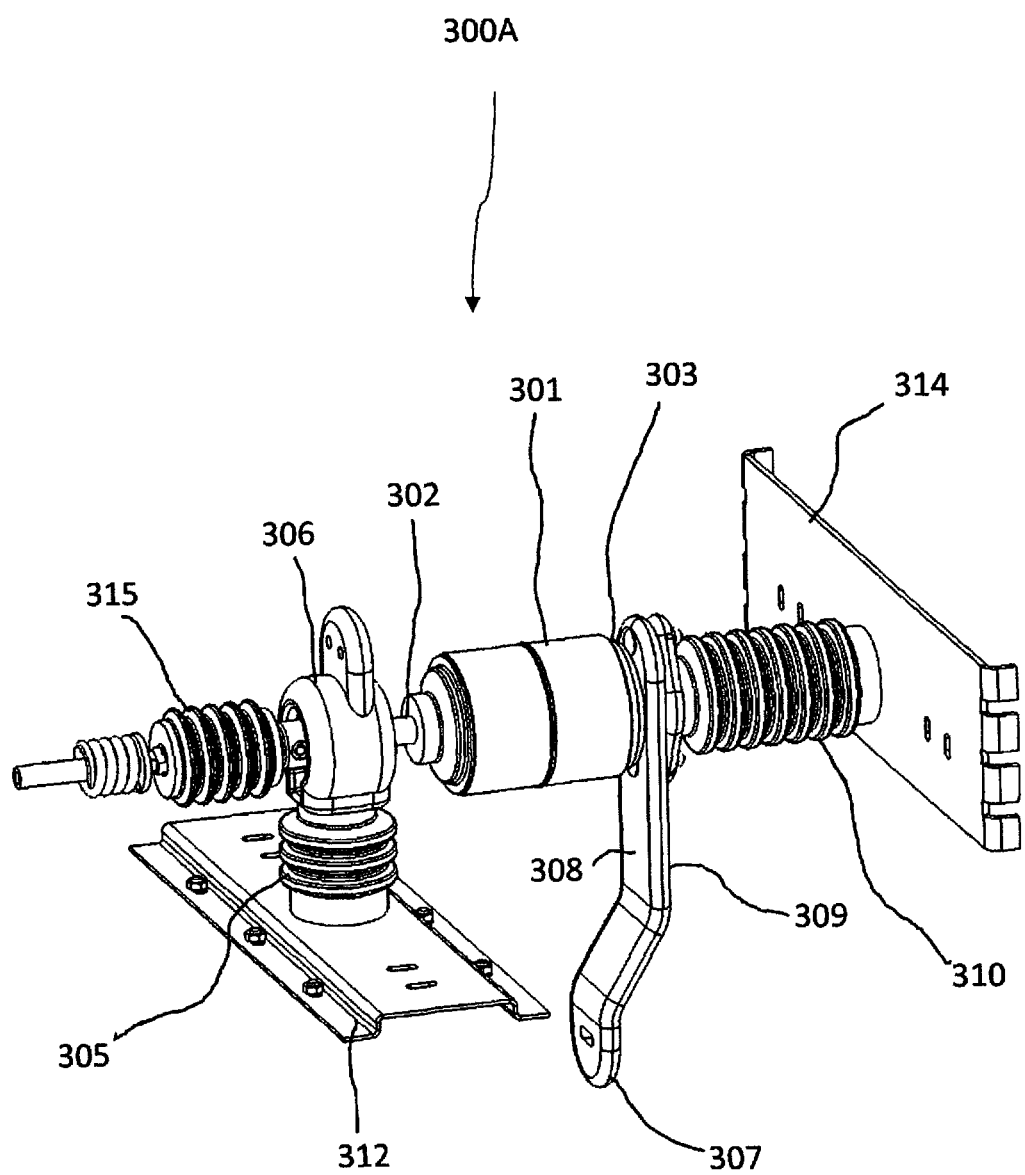
FIG. 14 shows a schematic view of the circuit breaker according to FIG. 13.
Figure 15:
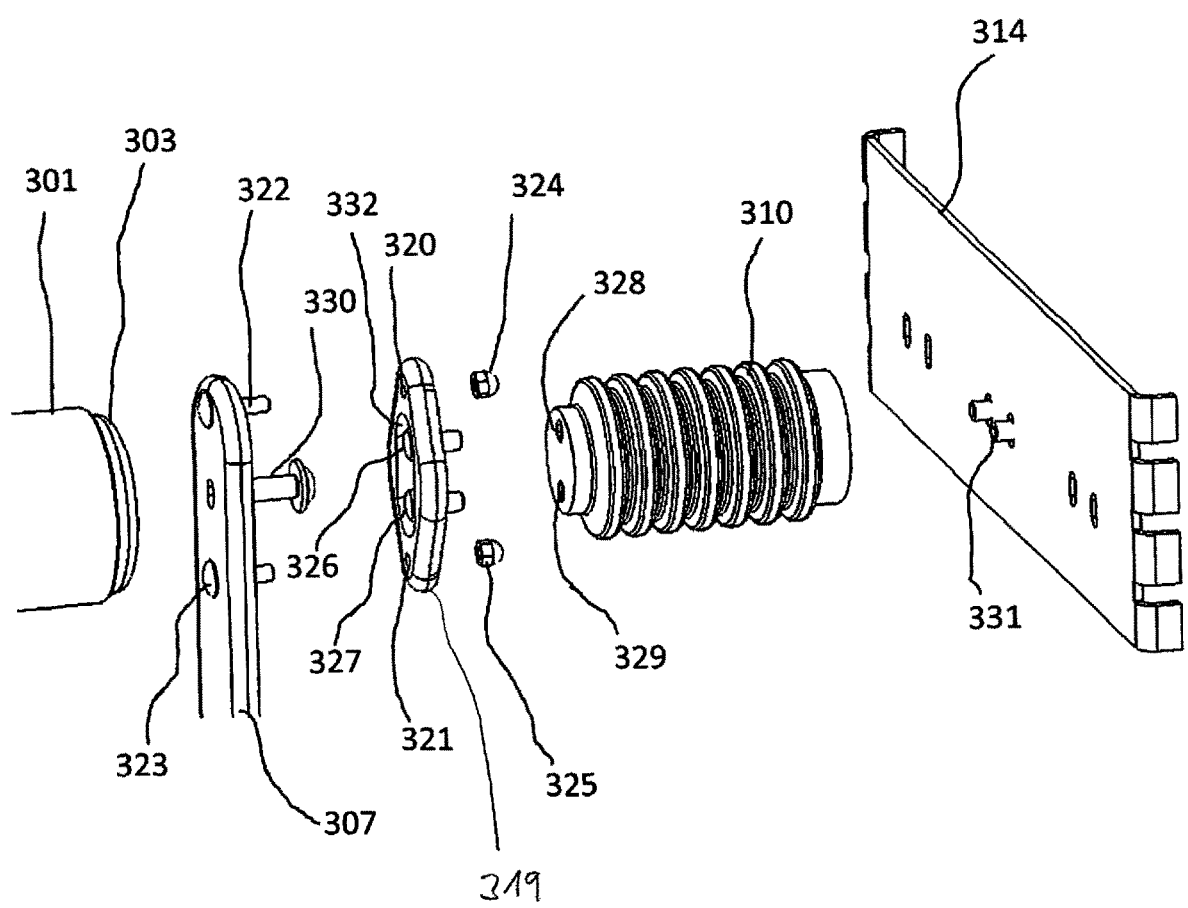
FIG. 15 shows a schematic view of the assembling of an insulator to a vacuum interrupter.

A second embodiment of the circuit breaker 300A is shown in FIGS. 13 to 15. The second embodiment of the circuit breaker 300A shown in FIGS. 13 to 15 is based on the first embodiment of the circuit breaker 300A shown in FIGS. 10 to 12. Identical reference signs refer to identical components. All of the aforementioned explanations with respect to the first embodiment of the circuit breaker 300A also apply to the second embodiment of the circuit breaker 300A as shown in FIGS. 13 to 15.

Rather than having a parallel alignment of the second center axis 311 of the second insulator 310 to the first center axis 304 of the vacuum interrupter 301, the second embodiment of the circuit breaker 300A shown in FIGS. 13 to 15 has a different alignment of the axes. The second center axis 311 of the second insulator 310 is collinear with the first center axis 304 of the vacuum interrupter 301 and, therefore, is also collinear with the fourth center axis of the insulating push rod 315.

As shown in FIG. 15, the second embodiment of the circuit breaker 300A comprises an intermediate plate 319 arranged between the busbar 307 and the second insulator 310. The intermediate plate 319 may be a metallic plate, in particular an aluminum plate, a steel plate and/or a copper plate. The intermediate plate 319 comprises a first through-opening 320 and a second through-opening 321. The busbar 307 comprises a first bolt 322 and a second bolt 323. The first bolt 322 is guided through the first through-opening 320 and is secured by a first nut 324 for arranging the intermediate plate 319 to the busbar 307. Moreover, the second bolt 323 is guided through the second through-opening 321 and is secured by a second nut 325 for arranging the intermediate plate 319 to the busbar 307.

The intermediate plate 319 comprises a first screw element 326 and a second screw element 327. Moreover, a first end of the second insulator 310 comprises a first opening 328 and a second opening 329 for inserting the first screw element 326 and the second screw element 327 into the second insulator 310 for arranging the intermediate plate 319 to the second insulator 310. In other words, the second insulator 310 is fixed and/or mounted to the intermediate plate 319 by the first screw element 326, the second screw element 327, the first opening 328 and the second opening 329. A second end of the second insulator 310 may be connected to the second support device 314 comprising screws 331 which are inserted into the second end of the second insulator 310.

The intermediate plate 319 also comprises a slot 332 into which a connecting means 330 is arranged. Therefore, the slot 332 provides space for the connecting means 330. The connecting means 330 is arranged at the busbar 307 and is connected to the second stationary contact 303 of the vacuum interrupter 301. In other words, the intermediate plate 319 is conductively and/or mechanically connected to the second stationary contact 303 of the vacuum interrupter 301. The connecting means 330 is an electrical conductor. The connecting means 330 may be any kind of connecting means suitable for the circuit breaker 300A according to the invention, such as a screw and/or a nut/bolt connection.

The second embodiment of the circuit breaker 300A according to the FIGS. 13 to 15 provides for a good support of the second stationary contact 303 of the vacuum interrupter 301. This is advantageous since a force of around 1,500 N or higher is often applied to the second stationary contact 303 of the vacuum interrupter 301.

As mentioned above, the disconnector unit 200 is connected to the circuit breaker unit 300 by the first electrical conducting unit 201, the second electrical conducting unit 202 and the third electrical conducting unit 203. The circuit breaker unit 300 comprises three circuit breakers 300A as described above. Each of the aforementioned conducting units 201, 202 and 203 are connected to one contact unit 306 of a circuit breaker 300A of the circuit breaker unit 300.

Other embodiments of the invention will be apparent to those skilled in the art from a consideration of the specification and/or an attempt to put into practice the invention disclosed herein. It is intended that the specification and examples be considered as exemplary only, with the true scope and spirit of the invention being indicated by the following claims.

LIST OF REFERENCE SIGNS 100 gas insulated tank
200 disconnector unit
201 first electrical conducting unit
202 second electrical conducting unit
203 third electrical conducting unit
204 mounting unit
205 first disconnector insulator
206 second disconnector insulator
207 third disconnector insulator
208 first electrical conductor
209 second electrical conductor
210 third electrical conductor
211 first contact unit
212 second contact unit
213 third contact unit
214 first disconnector pole
215 second disconnector pole
216 third disconnector pole
217A first contact of first disconnector pole
217B second contact of second disconnector pole
217C third contact of third disconnector pole
218 metallic contact device
219 metallic housing
220A first part of first metallic contact unit
220B second part of first metallic contact unit
221A first part of second metallic contact unit
221B second part of second metallic contact unit
222A first part of third metallic contact unit
222B second part of third metallic contact unit
223 first holder
224 second holder 225 third holder
226 fourth holder
227 first spring unit
228 second spring unit
229 third spring unit
230 fourth spring unit
231 first groove
232 second groove
233 third groove
234 fourth groove
235A first middle section
235B second middle section
235C third middle section
236 first housing part
237 second housing part
238 opening
239 first wing unit
240 further first wing unit
241 second wing unit
242 further second wing unit
243 countersunk formation
244 screws
245 first cut-out
246 second cut-out
247 first countersunk formation
248 first chamfer
249 second countersunk formation
250 second chamfer
251 rod, in particular polymeric insulating rod
252 rotation axis
253 first main body
254 second main body
255 outer surface
256 outer surface
257 tip of blade
300 circuit breaker unit
300A circuit breaker
301 vacuum interrupter
302 first movable contact
303 second stationary contact
304 first center axis
305 first insulator
306 contact unit
307 busbar
308 first side of busbar
309 second side of busbar
310 second insulator
311 second center axis
312 third center axis
313 first support device
314 second support device
315 insulating push rod
316 screw
317 first screw
318 second screw
319 intermediate plate
320 first through-opening
321 second through-opening
322 first bolt
323 second bolt
324 first nut
325 second nut
326 first screw element
327 second screw element
328 first opening
329 second opening
330 connecting means
331 screws
332 slot
1000 gas insulated switch gear

The invention claimed is:

1. A disconnector pole for a gas insulated switchgear, wherein:
the disconnector pole is movable between at least two contact positions,
the disconnector pole comprises at least one metallic contact device including a metallic contact finger to be connected to contacts in the two contact positions,
the metallic contact device comprises an outer surface,
the disconnector pole comprises at least one metallic housing with a cavity, wherein at least 50% of an entirety of the outer surface of the metallic contact device is arranged in the metallic housing, and
the metallic housing comprises two metallic components holding the metallic contact device positioned inside the cavity of the metallic housing for providing a contact force for the metallic contact device, the contact force being supplied by at least one spring unit.

2. The disconnector according to claim 1, wherein the disconnector pole comprises at least one of the following features:
(i) at least 60% or at least 70% or at least 80% of the entirety of the outer surface of the metallic contact device is arranged in the metallic housing; and
(ii) the metallic housing covers the metallic contact device in critical regions and increases a radius of curvature.

3. The disconnector pole according to claim 1, wherein the disconnector pole is movable between at least three contact positions.

4. The disconnector pole according to claim 1, wherein the disconnector pole comprises one of the following features:
(i) the metallic contact device comprises at least one first metallic contact unit and at least one second metallic contact unit being separate to the at least one first metallic contact unit, wherein the at least one first metallic contact unit and the at least one second metallic contact unit are arranged opposite to each other in the metallic housing, and wherein the at least one first metallic contact unit and the at least one second metallic contact unit touch each other;
(ii) the metallic contact device comprises at least one first metallic contact unit and at least one second metallic contact unit being separate to the at least one first metallic contact unit, wherein the at least one first metallic contact unit and the at least one second metallic contact unit are arranged opposite to each other in the metallic housing, wherein the at least one first metallic contact unit and the at least one second metallic contact unit touch each other, and wherein the at least one first metallic contact unit and the at least one second metallic contact unit are arranged proximate to at least one holder, the holder being biased by the at least one spring unit; and
(iii) the metallic contact device comprises at least one first metallic contact unit and at least one second metallic contact unit being separate to the at least one first metallic contact unit, wherein the at least one first metallic contact unit and the at least one second metallic contact unit are arranged opposite to each other in the metallic housing, wherein the at least one first metallic contact unit and the at least one second metallic contact unit touch each other, wherein the at least one first metallic contact unit and the at least one second metallic contact unit are arranged proximate to at least one holder, wherein the holder is biased by the at least one spring unit and wherein the holder is arranged in at least one first groove arranged at the at least one first metallic contact unit and in at least one second groove arranged at the at least one second metallic contact unit.

5. The disconnector pole according to claim 1, wherein the disconnector pole comprises one of the following:
  (i) the metallic contact device comprises at least one first metallic contact unit, at least one second metallic contact unit being separate to the at least one first metallic contact unit and at least one third metallic contact unit being separate to the at least one first metallic contact unit and the at least one second metallic contact unit, wherein the at least one first metallic contact unit and the at least one second metallic contact unit are arranged opposite to each other in the metallic housing, wherein the at least one second metallic contact unit and the at least one third metallic contact unit are arranged opposite to each other in the metallic housing, wherein the at least one first metallic contact unit and the at least one second metallic contact unit touch each other, and wherein the at least one second metallic contact unit and the at least one third metallic contact unit touch each other;
  (ii) the metallic contact device comprises at least one first metallic contact unit, at least one second metallic contact unit being separate to the at least one first metallic contact unit and the at least one third metallic contact unit being separate to the at least one first metallic contact unit and the at least one second metallic contact unit, wherein the at least one first metallic contact unit and the at least one second metallic contact unit are arranged opposite to each other in the metallic housing, wherein the at least one second metallic contact unit and the at least one third metallic contact unit are arranged opposite to each other in the metallic housing, wherein the at least one first metallic contact unit and the at least one second metallic contact unit touch each other, wherein the at least one second metallic contact unit and the at least one third metallic contact unit touch each other, and wherein the at least one first metallic contact unit, the at least one second metallic contact unit and the at least one third metallic unit are arranged proximate to at least one holder, the holder being biased by the at least one spring unit; and
  (iii) the metallic contact device comprises at least one first metallic contact unit, at least one second metallic contact unit being separate to the at least one first metallic contact unit and the at least one third metallic contact unit being separate to the at least one first metallic contact unit and the at least one second metallic contact unit, wherein the at least one first metallic contact unit and the at least one second metallic contact unit are arranged opposite to each other in the metallic housing, wherein the at least one second metallic contact unit and the at least one third metallic contact unit are arranged opposite to each other in the metallic housing, wherein the at least one first metallic contact unit and the at least one second metallic contact unit touch each other, wherein the at least one second metallic contact unit and the at least one third metallic contact unit touch each other, and wherein the at least one first metallic contact unit, the at least one second metallic contact unit and the at least one third metallic contact unit are arranged proximate to at least one holder, wherein the holder is biased by the at least one spring unit and wherein the holder is arranged in at least one first groove arranged at the at least one first metallic contact unit, in at least one second groove arranged at the at least one second metallic contact unit and in at least one third groove arranged at the at least one third metallic contact unit.

6. The disconnector pole according to claim 1, further comprising one of the following features:
  (i) one of the metallic components of the metallic housing is a first housing part and the other one of the metallic components is a second housing part, wherein the first housing part and the second housing part are connected to each other, wherein an opening is arranged between the first housing part and the second housing part, and wherein the metallic contact device partly spans the opening;
  (ii) one of the metallic components of the metallic housing is a first housing part and at least another of the metallic components is a second housing part, wherein the first housing part and the second housing part are connected to each other, wherein an opening is arranged between the first housing part and the second housing part, wherein the metallic contact device partly spans the opening, wherein the first housing part has at least one first wing unit, wherein the second housing part has at least one second wing unit, wherein the first wing unit and the second wing unit each comprises connecting means for connecting the first housing part to the second housing part, wherein the first wing unit comprises at least one first cut-out and wherein the second wing unit comprises at least one second cut-out;
  (iii) one of the metallic components of the metallic housing is a first housing part and the other one of the metallic components is a second housing part, wherein the first housing part and the second housing part are connected to each other, wherein an opening is arranged between the first housing part and the second housing part, wherein the metallic contact device partly spans the opening, wherein the first housing part has at least one first wing unit, wherein the second housing part has at least one second wing unit, wherein the first wing unit and the second wing unit each comprise connecting means for connecting the first housing part to the second housing part, wherein the connecting means comprise at least one countersunk formation, wherein the first wing unit comprises at least one first cut-out, wherein the second wing unit comprises at least one second cut-out, wherein the first cut-out comprises at least one first countersunk formation and wherein the second cut-out comprises at least one second countersunk formation; and
  (iv) one of the metallic components of the metallic housing is a first housing part and the other one of the metallic components is a second housing part, wherein a first part of the metallic contact device is arranged in the first housing part, and wherein a second part of the metallic contact device is arranged in the second housing part.

7. The disconnector pole according claim 6, further comprising a disconnector unit including a first disconnector pole and a second disconnector pole.

8. The disconnector unit according to claim 7, wherein a rod is arranged in each of the cut-outs of the wing units of the first and second housing parts of the metallic housing of each one of the first disconnector pole and the second disconnector pole.

9. The disconnector unit according to claim 8, wherein:
the first disconnector pole and the second disconnector pole are rotatable around a rotation axis, and
the rod is arranged at a distance to and parallel to the rotation axis.

10. The disconnector unit according to claim 7, further including a third disconnector pole.

11. A gas insulated switchgear assembly comprising at least one disconnector pole according to claim 1.

12. A gas insulated switchgear assembly comprising at least one disconnector unit according to claim 7.

* * * * *